US009780666B2

(12) United States Patent
Odell et al.

(10) Patent No.: US 9,780,666 B2
(45) Date of Patent: Oct. 3, 2017

(54) POWER CONVERTER CONTROLLER WITH STABILITY COMPENSATION

(71) Applicant: Power Integrations, Inc., San Jose, CA (US)

(72) Inventors: Arthur B. Odell, Morgan Hill, CA (US); Vikram Balakrishnan, Mountain View, CA (US); Roland S. Saint-Pierre, Jr., San Jose, CA (US)

(73) Assignee: Power Integrations, Inc., San Jose, CA (US)

(*) Notice: Subject to any disclaimer, the term of this patent is extended or adjusted under 35 U.S.C. 154(b) by 0 days.

(21) Appl. No.: 14/679,848

(22) Filed: Apr. 6, 2015

(65) Prior Publication Data

US 2016/0141961 A1     May 19, 2016

Related U.S. Application Data

(60) Provisional application No. 62/080,147, filed on Nov. 14, 2014.

(51) Int. Cl.
    *H02M 3/335*     (2006.01)
    *H02M 1/00*     (2006.01)

(52) U.S. Cl.
    CPC ... *H02M 3/33507* (2013.01); *H02M 3/33576* (2013.01); *H02M 3/33592* (2013.01); *H02M 2001/0025* (2013.01)

(58) Field of Classification Search
    CPC ......... H02M 3/33538; H02M 3/33546; H02M 3/33515; H02M 3/33576; H02M 3/33592; H02M 3/33553; H02M 3/33507
(Continued)

(56) References Cited

U.S. PATENT DOCUMENTS 6,711,039 B2 * 3/2004 Brkovic ............ H02M 3/33592
                                                            363/127
8,085,011 B1    12/2011   Petricek
(Continued)

FOREIGN PATENT DOCUMENTS

CN          103825433 A     5/2014

OTHER PUBLICATIONS

Mishra et al., "Dynamic Characterization of the Synthetic Ripple Modulator in a Tightly Regulated Distributed Power Application", IEEE Transactions on Industrial Electronics, vol. 56, No. 4, Apr. 2009, pp. 1164-1173.
(Continued)

*Primary Examiner* — Timothy J Dole
*Assistant Examiner* — Bryan R Perez
(74) *Attorney, Agent, or Firm* — Christensen O'Connor Johnson Kindness PLLC

(57) ABSTRACT

A switch mode power converter includes a primary side, an energy transfer element, and a secondary side. The secondary side includes output terminals coupled to a load and an output capacitance across the output terminals. The secondary side further includes a compensation signal generator— configured to generate a compensation signal. The compensation signal compensates charging the output capacitance with power transferred from the primary side to the secondary side. The secondary side further includes computational circuitry configured to output an adjusted compensation signal that compensates, based on the compensation signal, one of an output sense signal representative of an output signal at the output terminals and a reference signal representative of a desired output voltage of the switch mode power converter. The secondary side further includes a comparator to compare the adjusted compensation signal (Continued)

with the other one of the output sense signal and the reference signal.

37 Claims, 7 Drawing Sheets

(58) Field of Classification Search
USPC .. 363/21.04, 21.06, 21.14, 21.12, 17, 21.02, 363/125–127
See application file for complete search history.

(56) References Cited

U.S. PATENT DOCUMENTS

| | | | |
|---|---|---|---|
| RE43,414 E | 5/2012 | Walters et al. | |
| 8,174,250 B2 | 5/2012 | Wu et al. | |
| 8,779,731 B2 | 7/2014 | Menegoli et al. | |
| 2002/0015319 A1* | 2/2002 | Hartular | H02M 3/1584 363/56.05 |
| 2007/0025031 A1* | 2/2007 | Kwon | H02M 3/33561 361/38 |
| 2008/0007975 A1* | 1/2008 | Kashima | H02M 3/33523 363/21.1 |
| 2011/0007529 A1* | 1/2011 | Usui | H02M 3/33569 363/21.12 |
| 2011/0051464 A1* | 3/2011 | Lou | H02M 3/33592 363/21.02 |
| 2011/0096578 A1 | 4/2011 | Fang et al. | |
| 2011/0176334 A1* | 7/2011 | Imori | H02M 3/3376 363/21.02 |
| 2012/0170330 A1* | 7/2012 | Yang | H02M 1/4258 363/21.13 |
| 2013/0002223 A1 | 1/2013 | Xi | |
| 2013/0141069 A1 | 6/2013 | Li | |
| 2013/0241511 A1 | 9/2013 | Xi | |
| 2014/0254212 A1 | 9/2014 | Matthews et al. | |

OTHER PUBLICATIONS

Ngo et al., "Synthetic-Ripple Modular for Synchonous Buck Converter", IEEE Power Electronics Letters, vol. 3, No. 4, Dec. 2005, pp. 148-151.
International Application No. PCT/US2015/059731—International Search Report and Written Opinion, mailed Apr. 5, 2016 (13 pages).

* cited by examiner

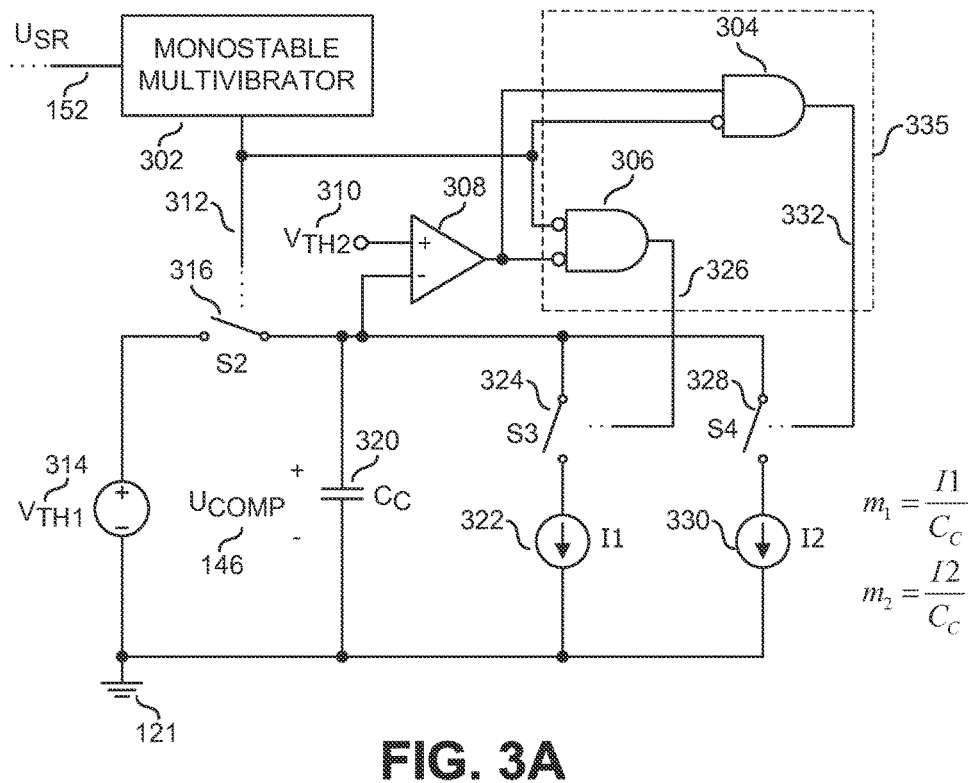
FIG. 3A
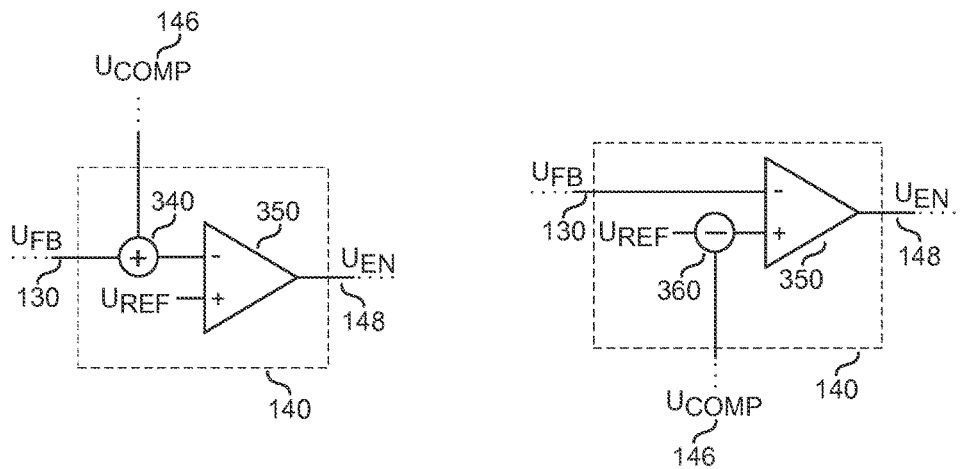
FIG. 3B  FIG. 3C

POWER CONVERTER CONTROLLER WITH STABILITY COMPENSATION

CROSS-REFERENCE TO RELATED APPLICATIONS

This application claims the benefit of U.S. Provisional Application No. 62/080,147, filed on Nov. 14, 2014, entitled POWER CONVERTER CONTROLLER WITH STABILITY COMPENSATION, which is hereby incorporated by reference in its entity for all purposes.

BACKGROUND

1. Field

This disclosure relates generally to power conversion, and more specifically, to a power converter controller with stability compensation.

2. Description of Related Art

Many electronic devices such as cell phones, laptop computers, etc., use direct current (dc) power to operate. Conventional wall outlets generally deliver a high voltage alternating current (ac) power that needs to be transformed to dc power in order to be used as a power source by most electronic devices. Switched mode power converters are commonly used due to their high efficiency, small size, and low weight to convert the high voltage ac power to a regulated dc power. A switched mode power converter produces an output by periodically switching a power switch for one or more switching cycles.

A switched mode power converter may employ a controller to regulate output power delivered to an electrical device, such as a battery, which may be generally referred to as a load. The controller regulates power to the load by controlling a power switch to turn on and off in response to a feedback signal representative of the output of the power converter. In one example, the controller may use an on/off control technique to regulate an output of a switched mode power converter. In a typical on/off control technique, the controller decides whether to enable or disable the conduction of the power switch for each switching cycle by comparing the feedback signal with a threshold at the end of the previous switching cycle. For example, the controller may switch the power switch on (i.e., may initiate a switching activity) for the next switching cycle if the feedback signal is less than the threshold at the end of the previous switching cycle.

Switch mode power converters typically include an output capacitor to smooth out the ripple in the output voltage. The output capacitor may have a resistance associated with it that may be referred to as an equivalent series resistance (ESR). In some cases where the controller uses on/off control technique and the output capacitor has a small ESR, the feedback signal may not react quickly enough to the transfer of energy from the input to the output. For example, the feedback signal may not cross the threshold quickly enough after the power switch is switched off in a switching cycle such that the power switch is switched on too soon after the previous switching activity. This may lead to grouping of switching activity and result in unstable operation of the power converter.

Additionally, in some cases, noise may couple to the feedback signal such that the controller may not accurately detect the time that the feedback signal crosses the threshold. As a result, the controller may start mistiming the switching of the power switch which may lead to instability of the power converter.

DESCRIPTION OF THE FIGURES

Non-limiting and non-exhaustive embodiments are described with reference to the following figures, wherein like reference numerals refer to like parts throughout the various views unless otherwise specified.

FIG. 3A is a functional block diagram of an example compensation circuit according to various examples.

FIG. 3B is a functional block diagram of an example feedback reference circuit according to various examples.

FIG. 3C is a functional block diagram of another example feedback reference circuit according to various examples.

Figure 1:
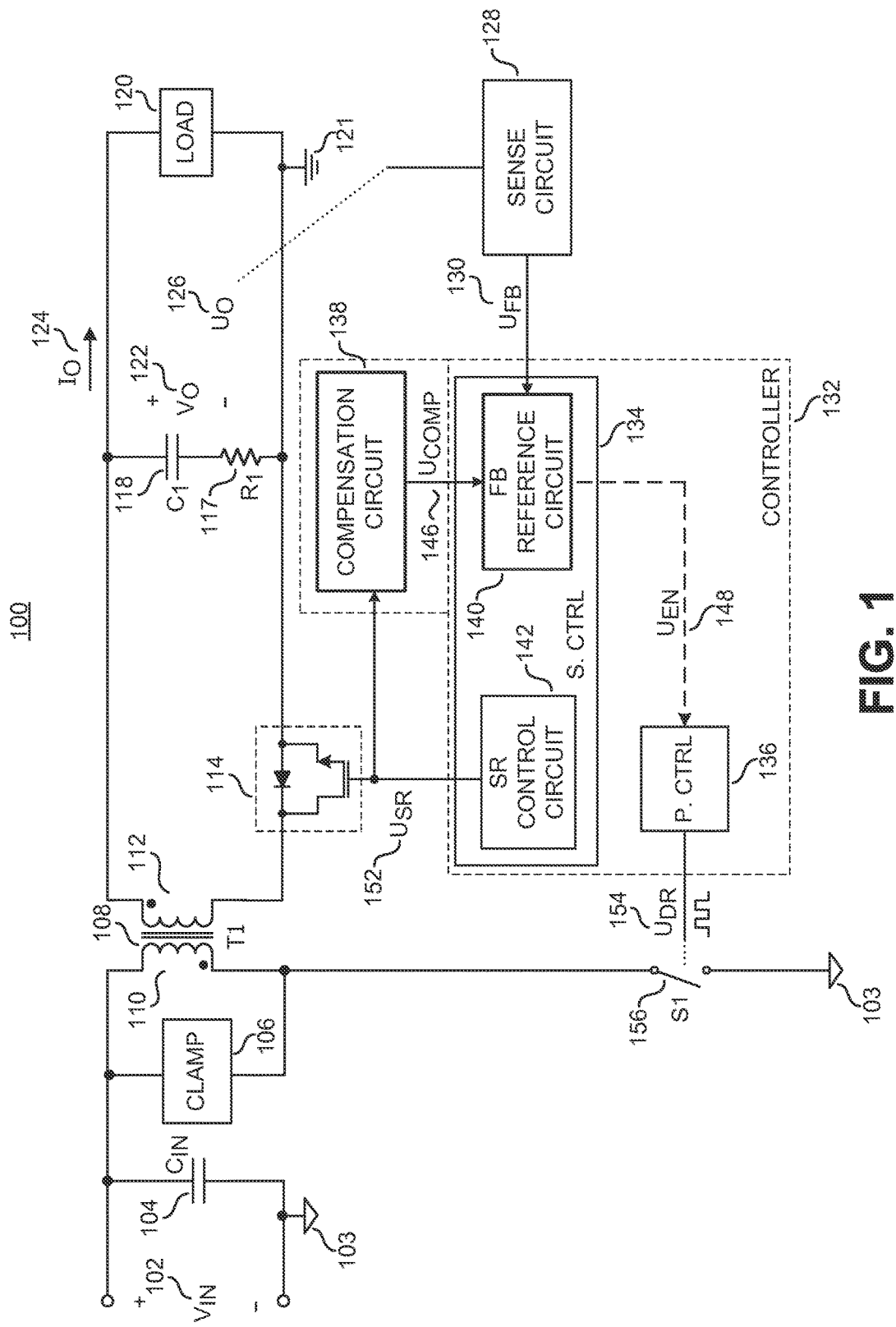
FIG. 1 is a functional block diagram illustrating an example power converter utilizing a compensation circuit according to various examples.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

FIG. 1 shows a schematic of one example power converter utilizing a compensation circuit. In one example, power converter 100 is an on/off power converter. In the illustrated example, power converter 100 is a switch mode power converter that uses an on/off control scheme to regulate an output quantity $U_O$ 126 (e.g., an output voltage, an output current, or combination of the two). Specifically, power converter 100 includes a synchronous rectification circuit 114 and is configured to be a flyback power converter. As further shown, power converter 100 also includes a controller 132 coupled to receive a signal representative of output quantity $U_O$ 126 and control the circuits of power converter 100. Power converter 100 receives an unregulated input voltage $V_{IN}$ 102 at the input to produce an output voltage $V_O$ 122 and an output current $I_O$ 124 to an electrical load 120. Input voltage $V_{IN}$ 102 may be a rectified and filtered ac voltage. As shown, input voltage $V_{IN}$ 102 is referenced to a primary ground 103, also referred to as an input return and output voltage $V_{OUT}$ 122 is referenced to a secondary ground 121, also referred to as an output return. In other examples, power converter 100 may have more than one output.

As further shown in FIG. 1, controller 132 includes a primary controller 136 and a secondary controller 134 to control the circuits of power converter 100 to regulate the output voltage $V_O$ 122 at a desired voltage level. In one example, power converter 100 may regulate output voltage $V_O$ 120 to the desired voltage level after a startup period. The startup period may be a period of time starting from when power converter 100 is introduced to input voltage $V_{IN}$ 102 until primary controller 136 and secondary controller 134 begin operating to regulate output voltage $V_O$ 122. In the example power converter 100, an output capacitor C1 118 is coupled to the output to smooth out the ripple in output voltage $V_O$ 122. In series with output capacitor C1 118 is a resistor R1 117, which represents the equivalent series resistance (ESR) of output capacitor C1 118.

Also included in FIG. 1 is an energy transfer element T1 108 that is illustrated as a coupled inductor with a primary winding 110 and a secondary winding 112. Energy transfer element T1 108 is coupled to transfer energy from primary winding 110 to secondary winding 112. Additionally, energy transfer element T1 108 provides galvanic isolation between circuits on the primary side of power converter 100 and circuits on the secondary side of power converter 100. In other words, a dc voltage applied between the primary side and the secondary side of power converter 100 will produce substantially zero current.

Circuits that are electrically coupled to primary winding 110 may be referred to as the primary side of power converter 100. Similarly, circuits that are electrically coupled to secondary winding 112 may be referred to as the secondary side of power converter 100. In the depicted example, power switch S1 156 is coupled to energy transfer element 108 at primary winding 110 and coupled to the input of power converter 100 at input return 103. Power switch S1 156 may be a metal oxide field effect transistor (MOSFET), a bipolar junction transistor (BJT) or the like. As shown, primary controller 136 is coupled to the circuit components of the primary side such as power switch S1 156. Secondary controller 134 is coupled to the circuits on the secondary side such as a synchronous rectification circuit 114, secondary winding 112 along with other circuit components. In operation, primary controller 136 and secondary controller 134 control the circuits of power converter 100 (e.g., switching device S1 156 and synchronous rectification circuit 114) to control energy transfer through energy transfer element T1 108 from the input to the output of power converter 100.

A clamp circuit 106 is coupled across primary winding 110 of energy transfer element T1 108 and to the input of power converter 100. Clamp circuit 106 operates to clamp any turn-off spikes that result from leakage inductance from primary winding 110 across the power switch S1 156.

Primary controller 136 and secondary controller 134 may be included in an integrated circuit. In one example, primary controller 136 is included in a first integrated circuit die and a secondary controller 134 is included in a second integrated circuit die that are both disposed in an integrated circuit package. In one example, power switch S1 156 may be included in a monolithic or hybrid structure in an integrated circuit package that also includes primary controller 136 and secondary controller 134. In one example, power switch S1 156 is disposed on a first integrated circuit die that also includes primary controller 136 and secondary controller 134 is included in a second integrated circuit die. In another example, power switch S1 156 is disposed on a first integrated circuit die, primary controller 136 is included in a second integrated circuit die, and secondary controller 134 is included in a third integrated circuit die. The die including the primary controller 136 can be galvanically isolated from the die including the secondary controller 134. Accordingly, primary controller 136 can be galvanically isolated from secondary controller 134.

Although primary controller 136 and secondary controller 134 are galvanically isolated from one another, primary controller 136 and secondary controller 134 may communicate with one another. Specifically, secondary controller 134 may communicate with primary controller 136 by providing a signal through a magnetically coupled communication link (not shown in FIG. 1). In one example, the communication link between primary controller 136 and secondary controller 134 may be implemented using galvanically isolated conductive loops included in the lead frame of an integrated circuit package. Alternatively, secondary controller 134 may provide a signal to primary controller 136 through an opto-coupler or a coupled inductor.

In the illustrated example, secondary controller 134 transmits an enable signal $U_{EN}$ 148 to primary controller 136. Primary controller 136 controls the state of power switch S1 156 in response to enable signal $U_{EN}$ 148. For example, power switch S1 156 may operate in an ON state (e.g., as a closed switch) or in an OFF state (e.g., as an open switch) depending on a drive signal $U_{DR}$ 154 generated by primary controller 136 in response to enable signal $U_{EN}$ 148. Transitioning of power switch S1 156 from the OFF state to the ON state may be referred to as a switching activity. In operation, primary controller 136 controls current through power switch S1 156 and primary winding 110.

When power switch S1 156 is in the ON state, the current through primary winding 110 increases the energy stored in energy transfer element T1 108. A primary winding voltage with a first polarity develops across primary winding 110. A secondary winding voltage with an opposite polarity of the primary winding voltage develops across secondary winding 112 when power switch S1 156 is in the ON state. Synchronous rectification circuit 114 may act as an open circuit when the voltage at the dotted end of secondary winding 112 is less than the voltage at the other end.

Primary controller 136 may transition power switch S1 156 from the ON state to the OFF state, thereby blocking the current through power switch S1 156 when the current through primary winding 110 reaches a current limit, which in one example is a fixed limit. When power switch S1 156 transitions from the ON state to the OFF state, the voltage at the dotted end of secondary winding 112 becomes greater than the voltage at the other end and allows for energy to be transferred to output capacitor C1 118, providing power to electrical load 120. In one example, secondary controller 134 may control synchronous rectification circuit 114 to act as a closed switch (i.e., to conduct current) when the voltage at the dotted end of secondary winding 112 becomes greater than the voltage at other end so that output capacitor C1 118 is charged.

In the depicted example, secondary controller 134 includes an SR control circuit 142 to generate a control signal $U_{SR}$ 152 to control synchronous rectification circuit 114. As shown, synchronous rectification circuit 114 is coupled to secondary winding 112 on the secondary side of power converter 100. In the illustrated example, synchronous rectification circuit 114 includes a switch controlled by control signal $U_{SR}$ 152 from SR control circuit 142. In one example, the switch is a MOSFET whose gate is coupled to control signal $U_{SR}$ 152. The switch may operate in the ON state (i.e., the switch is turned ON) or in the OFF state (i.e., the switch is turned OFF) depending on control signal $U_{SR}$ 152. When turned ON by the control signal $U_{SR}$ 152, the switch of synchronous rectification circuit 114 may conduct current. In the illustrated example, synchronous rectification circuit 114 includes a diode, which may be a discrete component or may be included in the same component as the illustrated switch (e.g., body diode of the MOSFET).

Secondary controller 134 also includes a feedback reference circuit 140 coupled to receive a feedback signal $U_{FB}$ 130 and a compensation signal $U_{COMP}$ 146. Feedback signal $U_{FB}$ 130 is representative of output quantity $U_O$ 126 of power converter 100. Output quantity $U_O$ 156 may include output voltage $V_O$ 120 and/or output current $I_O$ 118. In one example, a sense circuit 128 is coupled to sense output quantity $U_O$ 126 and to generate feedback signal $U_{FB}$ 130 in response to output quantity 156. Feedback signal $U_{FB}$ 130 may be referred to as an output sense signal. In one example, sense circuit 128 includes a resistive divider coupled to the output of power converter 100 to generate feedback signal $U_{FB}$ 130 as a scaled down voltage representative of output voltage $V_O$ 120. In one example, sense circuit 128 is disposed on the same integrated circuit die as secondary controller 134.

In the depicted example, compensation signal $U_{COMP}$ 146 is generated by compensation circuit 138 which is coupled to receive control signal $U_{SR}$ 152. Specifically, compensation circuit 138 outputs compensation signal $U_{COMP}$ 146 in response to control signal $U_{SR}$ 152. In one example, compensation circuit 138 may be within controller 132. In another example, compensation circuit 138 may be outside of controller 132.

In operation, feedback reference circuit 140 compares feedback signal $U_{FB}$ 130 with a feedback threshold (not shown in FIG. 1) and sets enable signal $U_{EN}$ 148 to one of the two logic levels (logic high or logic low) based on this comparison in order to control the switching of power switch S1 156 through primary controller 136. For example, if feedback signal $U_{FB}$ 130 is less than the feedback threshold, which may indicate that output quantity $U_O$ 126 is below the desired level, feedback reference circuit 140 can set enable signal $U_{EN}$ 148 to logic high to indicate to primary controller 136 that power switch S1 156 should be transitioned to the ON state such that more energy can be stored in the primary winding 110 and then transferred to the output of power converter 100 the next time power switch S1 156 is transitioned to the OFF state, which will cause output quantity $U_O$ 126 to increase. In contrast, if feedback signal $U_{FB}$ 130 is greater than the feedback threshold, which may indicate that output quantity $U_O$ 126 is above the desired level, feedback reference circuit 140 can set enable signal $U_{EN}$ 148 to logic low to indicate to primary controller 136 that power switch S1 156 should be kept in the OFF state such that no more energy is stored in the primary winding 110 and delivered to the output of power converter 100, which will cause output quantity $U_O$ 126 to decrease. In this manner, controller 132 is converting an analog signal (feedback signal $U_{FB}$ 130) into a digital logic signal (drive signal $U_{DR}$ 154) to decide whether to operate power switch S1 156 in the ON state. In the illustrated example, feedback reference circuit 140 is not responsive to feedback signal $U_{FB}$ 130 for a threshold period, also referred to as a hold-off period, after power switch S1 156 transitions to the OFF state. That is, feedback reference circuit 140 does not change the logic level of enable signal $U_{EN}$ 148 during the hold-off period.

Power converter 100 can operate in continuous conduction mode, which may be typical for operation at heavier loads. A distinguishing characteristic of operation in continuous conduction mode is that the switch of synchronous rectification circuit 114 is generally turned ON during the off time of power switch S1 156 (e.g., during the entire time that power switch S1 156 is in the OFF state). At lighter loads, power converter 100 typically operates in discontinuous conduction mode, which is distinguished by having the switch of synchronous rectification circuit 114 generally turned ON for a portion of the off time of power switch S1 156.

In some cases, if a capacitor with a small ESR is used as output capacitor C1 118 in order to reduce losses, output quantity $U_O$ 126 (hence, feedback signal $U_{FB}$ 130) may not react quickly enough to the changes caused by synchronous rectification circuit 114 in continuous conduction mode. For example, when the switch of synchronous rectification circuit 114 is turned ON after power switch S1 156 is transitioned to the OFF state, feedback signal $U_{FB}$ 130 may not rise quickly enough to cross the feedback threshold by the end of the hold-off period. This can cause secondary controller 134 to command primary controller 136 (by way of setting enable signal $U_{EN}$ 148 to one of the logic levels) to transition power switch S1 156 to the ON state as soon as the hold-off period is over. As a result, power switch S1 156 may switch to the ON state but by doing so, may initiate a new switching activity too soon after the previous switching activity. This may lead to a pattern of grouped pulses in drive signal $U_{DR}$ 154 where several periods of switching activity will be followed by periods of no switching activity and therefore, unstable operation of power converter 100.

Additionally, when power converter 100 is operating in the discontinuous conduction mode, output voltage $V_O$ 122 (hence, feedback signal $U_{FB}$ 130) drops with a lower slope. When noise gets coupled to feedback signal $U_{FB}$ 130, the comparator inside feedback reference circuit 140 may not accurately detect the time that feedback signal $U_{FB}$ 130 reaches the feedback threshold. Consequently, feedback reference circuit 140 may mistime the transition of enable signal $U_{EN}$ 148 to the appropriate logic level, resulting in instability of power converter 100. By using compensation signal $U_{COMP}$ 146, which may be a piecewise linear waveform with dual slope, feedback reference circuit 140 can alter either feedback signal $U_{FB}$ 130 or the feedback threshold to mitigate the grouping of switching activity in continuous conduction mode and the mistiming of enable signal $U_{EN}$ 148 transitions in discontinuous conduction mode. In other words, feedback reference circuit 134 uses compensation signal $U_{COMP}$ 146 to maintain stable operation of power converter 100. In another example, compensation signal $U_{COMP}$ 146 is an exponential waveform.

Figure 2:
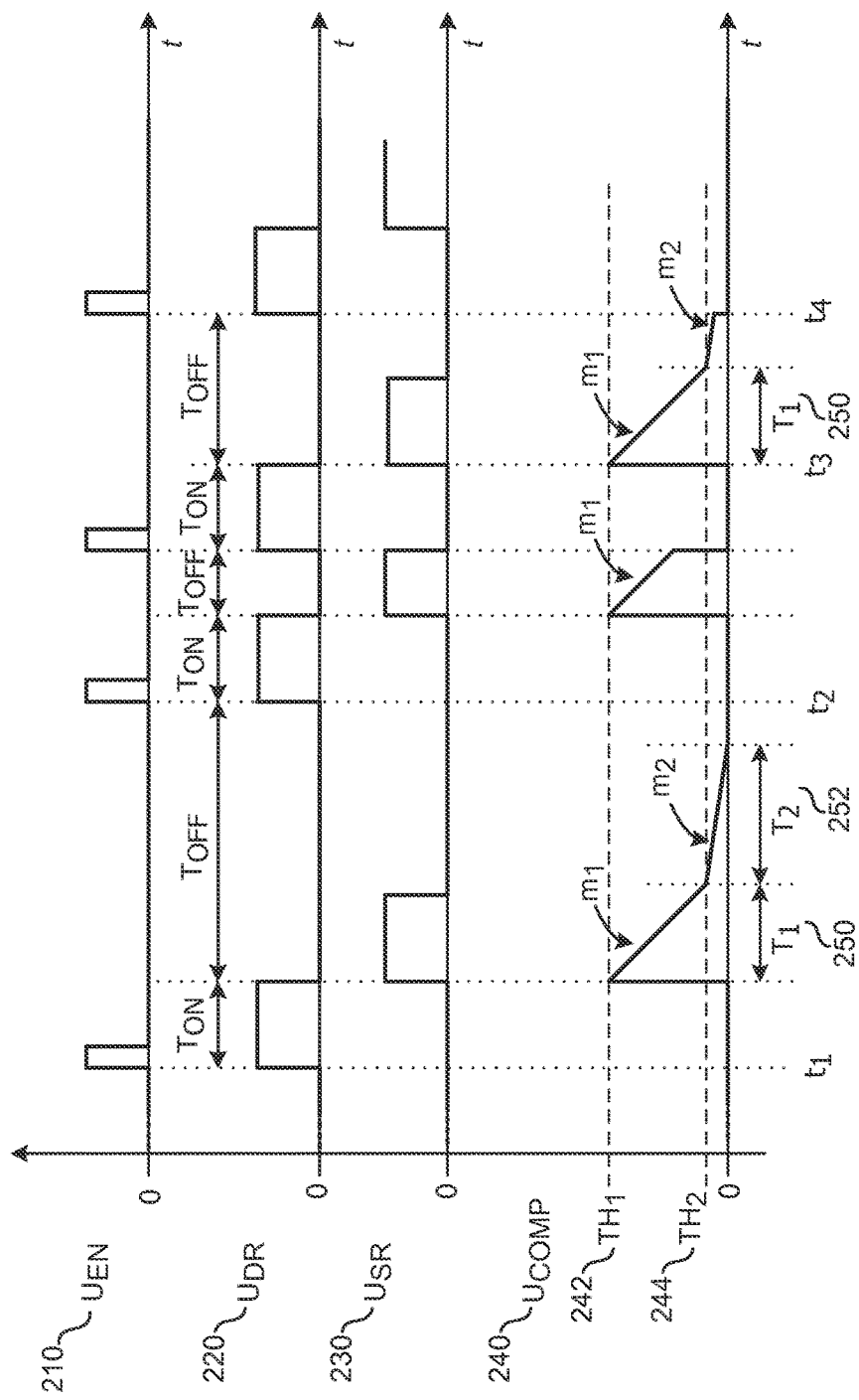
FIG. 2 is a diagram illustrating example waveforms of a drive enable signal, a drive signal, a synchronous rectifier control signal, and a compensation signal according to various examples.

FIG. 2 shows example waveforms for various signals that are associated with the controller of FIG. 1. Waveform 210 represents enable signal $U_{EN}$ 148, waveform 220 represents drive signal $U_{DR}$ 154, waveform 230 represents control signal $U_{SR}$ 230, and waveform 240 represents compensation signal $U_{COMP}$ 146. Every time waveform 210 is set to a logic high pulse, indicating that a new switching activity should begin (i.e., power switch S1 156 should transition to the ON state), waveform 220 transitions to a logic high level, which indicates that power switch S1 156 is in the ON state. Waveform 220 stays at logic high level until the current in primary winding 110 reaches a primary current threshold. The period of time that waveform 220 is at logic high level may be referred to as an on time of power switch S1 156. Once the current in primary winding 110 reaches the primary current threshold, waveform 220 drops to logic low and power switch S1 156 transitions to the OFF state. At this time, waveform 230 transitions to logic high level indicating that the switch of synchronous rectification circuit 114 is turned ON. Waveform 230 stays at logic high level until either waveform 220 transitions to logic high level indicating the start of a new switching activity or all of the energy stored in primary winding 110 is transferred to the output of power converter 100.

Waveform 240 is a piecewise linear waveform that starts at a first level TH1 242 when waveform 230 transitions to logic high and drops with a slope m1 until reaching a second level TH2 244. After that, waveform 240 drops with a slope m2 until reaching zero. Slope m2 is lower in magnitude than slope m1. Waveforms 210, 220, 230, and 240 between time t1 and t2 illustrate the operation of controller 132 in discontinuous conduction mode. Because power converter 100 is operating in discontinuous conduction mode waveform 230 is at logic high for a portion of the off time of power switch S1 156. Time period T1 250 corresponds to the time that waveform 240 drops from first level TH1 242 to second level TH2 244 and time period T2 252 corresponds to the time that waveform drops from second level TH2 244 to zero. Waveforms 210, 220, 230, and 240 between time t2 and t3 illustrate the operation of controller 132 in continuous conduction mode. Because power converter 100 is operating in continuous conduction mode waveform 230 is at logic high for the entire off time of power switch S1 156. In this case, waveform 240 first drops with slope m1 from first level TH1 242 to a level that is above second level TH2 244 and then becomes zero when waveform 220 transitions to logic high. Waveforms 210, 220, 230, and 240 between time t3 and t4 illustrate the operation of controller 132 in discontinuous conduction mode and therefore, are very similar to those between time t1 and t2. However, the off time of power switch S1 156 is shorter between time t3 and t4 such that waveform 240 first drops with slope m1 from first level TH1 242 to second level TH2 244 in time period T1 250 and after that drops with slope m2 to a level that is above zero and then becomes zero when waveform 220 transitions to logic high.

FIG. 3A shows a functional block diagram of an example compensation circuit that includes a monostable multivibrator 302, a voltage source 314, a capacitor 320, current sources 322 and 330, a comparator 308, and a logic circuitry 335. Voltage source 314 is on one end coupled to output return 121 and on the other end to capacitor 320 with a switch S2 316. Monostable multivibrator 302 is coupled to receive control signal $U_{SR}$ 152 and output a switch signal 312. Specifically, monostable multivibrator outputs a logic high pulse in response to control signal $U_{SR}$ 152 transitioning to one of the logic levels that indicates synchronous rectification circuit 114 should be turned ON. Switch S2 316 is coupled to receive switch signal 312. Signal 312 is coupled to be received by switch S2 316 and control the state of switch S2 316. For example, switch S2 316 can operate in an ON state (i.e., turned ON) or in an OFF state (i.e., turned OFF) depending on switch signal 312. When switch S2 316 is turned ON by switch signal 312, voltage source 314 provides a voltage $V_{TH1}$, which is representative of first level TH1 244, to capacitor 320. In other words, capacitor 320 is charged to voltage $V_{TH1}$.

Current sources 322 and 330 are coupled to capacitor 320 with switches S3 324 and S4 328, respectively. When switch S3 324 is turned ON, current source 322 discharges capacitor 320 with current I1. When switch S4 328 is turned ON, current source 330 discharges capacitor 320 with current I2. Switches S3 324 and S4 328 are coupled to receive outputs 326 and 332 of logic circuitry 335.

Voltage across capacitor 320 represents compensation signal $U_{COMP}$ 146. Comparator 308 is coupled to capacitor 320 to receive compensation signal $U_{COMP}$ 146 and compare compensation signal $U_{COMP}$ 146 with a voltage $V_{TH2}$ 310, which is representative of second level TH2 244. Output of comparator 308 is set to one of the logic levels based on this comparison. Logic circuitry includes AND gates 304 and 306. AND gate 304 is coupled to receive an output of comparator 308 and an inverted output of switch signal 312. Output 326 of AND gate 306 controls the state of switch S3 324. AND gate 304 is coupled to receive the inverted output of switch signal 312 and an inverted output of comparator 308. Output 332 of AND gate 304 controls the state of switch S4 328.

In operation, when control signal $U_{SR}$ 152 transitions to logic high, monostable multivibrator 302 outputs a logic high pulse in switch signal 312, causing switch S2 316 to turn ON. While switch signal 312 is logic high, outputs 326 and 332 of logic circuitry 335 are set to one of the logic levels such that switches S3 324 and S4 328 are in the OFF state. As a result, capacitor 320 is charged to voltage $V_{TH1}$ by voltage source 314. As soon as switch signal 312 returns to logic low, switch S2 316 turns OFF. Output 326 transitions to the logic level that causes switch S3 324 to turn ON. Output 332 is still at the logic level that keeps switch S4 328 in the OFF state because output of comparator 308 is set to logic low while the voltage across capacitor 320 is greater than voltage $V_{TH2}$ 310. With switch S3 324 turned ON, current source 322 starts discharging capacitor 320 with current I1. That is, compensation signal $U_{COMP}$ 146 drops with a slope that is equal to current I1 divided by capacitance CC of capacitor 320, which may correspond to slope m1. When the voltage across capacitor 320 reaches voltage $V_{TH2}$ 310, the output of comparator 308 transitions to logic high, causing output 326 to transition to the logic level that turns switch S3 324 OFF. At the same time, the transition of the output of comparator 308 to logic high causes output 332 to transition to the logic level that turns switch S4 328 ON. With switch S4 328 turned ON, current source 330 discharges capacitor 320 with current I2. That is, compensation signal $U_{COMP}$ 146 drops with a slope that is equal to current I2 divided by capacitance CC of capacitor 320, which may correspond to slope m2. In the illustrated example, current I1 is greater than current I2 such that slope m1 is greater in magnitude than slope m2.

FIG. 3B shows an example feedback reference circuit. In the depicted example, feedback reference circuit 140 includes a summation block 340 and a comparator 350. In one example, comparator 350 is an ON-OFF feedback comparator. Summation block 340 is coupled to receive compensation signal $U_{COMP}$ 146 and feedback signal $U_{FB}$ 130. Summation block 340 adds compensation signal $U_{COMP}$ 146 to feedback signal $U_{FB}$ 130 and provides the resulting signal, which may be referred to as a compensated feedback signal or a compensated output sense signal, to the negative input terminal of comparator 350. In the example of FIG. 3B, the compensated feedback signal is representative of an output that is higher than the desired output voltage of power converter 100 during at least a part of a time that the output capacitance is being charged. The positive input terminal of comparator 350 is coupled to receive a reference signal $U_{REF}$ which is representative of the desired level of output quantity $U_O$ 126. Comparator 350 is configured to output a comparison result signal indicative of a result of the comparison of the compensated feedback signal with the reference signal $U_{REF}$. Comparator 350 sets enable signal $U_{EN}$ 148 to one of the logic levels based on the comparison between reference signal $U_{REF}$ and the compensated feedback signal. In one example, the difference between the compensated feedback signal and the desired output voltage of power converter 100 decreases continuously in time. In one example, the difference decreases substantially linearly in time. In another example, the difference decreases substantially exponentially in time.

FIG. 3C shows another example feedback reference circuit. In this example, feedback reference circuit 140 includes a subtraction block 360 and the same comparator that was shown in FIG. 3B. Subtraction block 360 is coupled to receive compensation signal $U_{COMP}$ 146 and reference signal $U_{REF}$. Subtraction block 360 subtracts compensation signal $U_{COMP}$ 146 from reference signal $U_{REF}$ and provides the resulting signal, which may be referred to as a compensated reference signal, to the positive input terminal of comparator 350. In the example of FIG. 3C, the compensated reference signal is representative of an output that is lower than the desired output voltage of power converter 100. The negative input terminal of comparator 350 is coupled to receive feedback signal $U_{FB}$ 130. Comparator 350 is configured to compare the compensated reference signal with the feedback signal $U_{FB}$ 130 and output a comparison result signal. Comparator 350 sets enable signal $U_{EN}$ 148 to one of the logic levels based on the comparison between feedback signal $U_{FB}$ 130 and the compensated reference signal. In one example, the difference between the feedback signal $U_{FB}$ 130 and the compensated reference signal decreases continuously in time. In one example, the difference decreases substantially linearly in time. In another example, the difference decreases substantially exponentially in time. In one example, power converter 100 includes communication circuitry to communicate the comparison result signal to a primary side of the power converter 100, where the communication circuitry includes an optocoupler or a signal transformer.

Figure 4A:
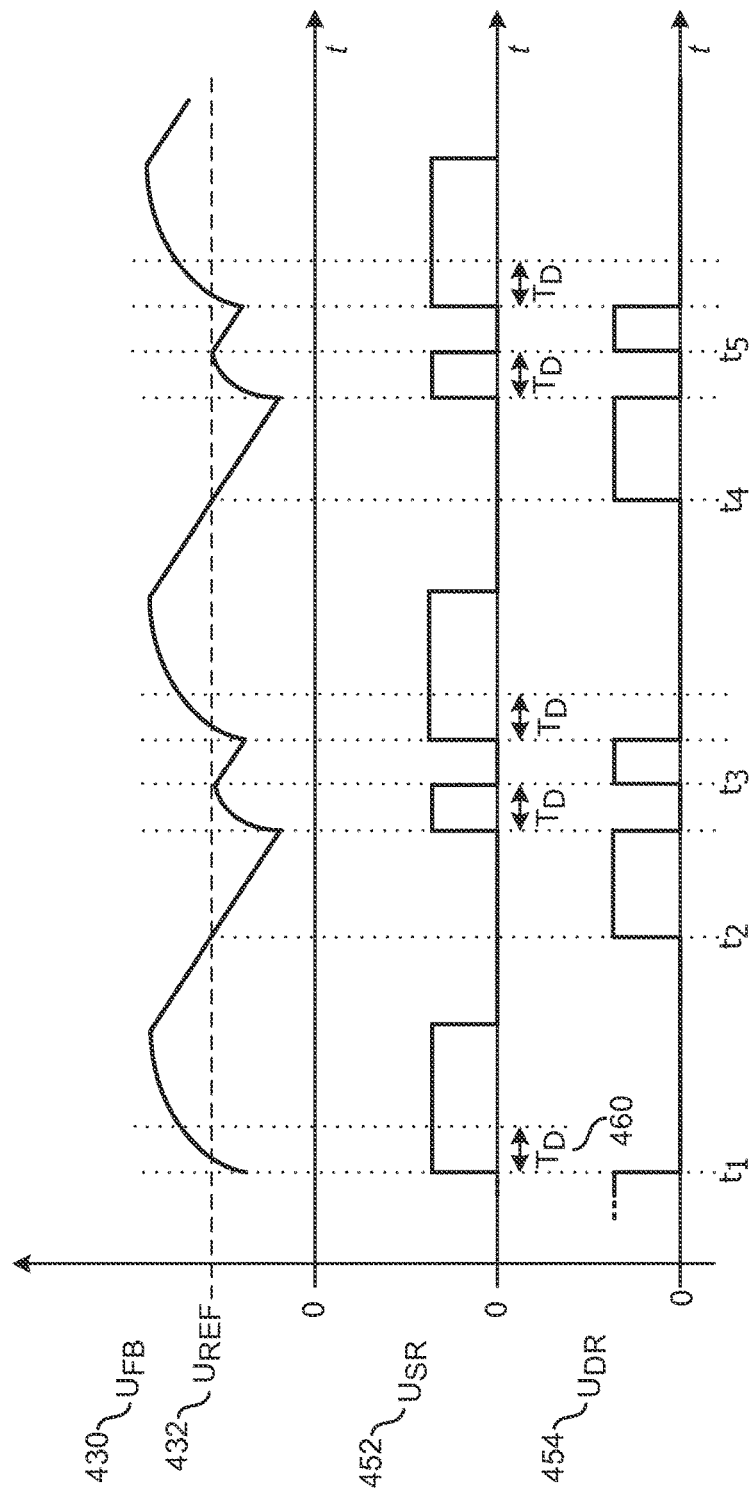
FIG. 4A is a diagram illustrating example waveforms of a feedback signal without compensation, a synchronous rectifier control signal, and a drive signal according to various examples.

FIG. 4A shows example waveforms that illustrate the operation of the controller in FIG. 1 when the compensation signal is not provided to the feedback reference circuit. Waveform 430 represents feedback signal $U_{FB}$ 130, waveform 452 represents control signal $U_{SR}$ 152, and waveform 454 represents drive signal $U_{DR}$ 154. Period TD 460 corresponds to the hold-off period during which feedback reference circuit 140 is not responsive to feedback signal $U_{FB}$ 130. Level $U_{REF}$ 432 represents the reference signal $U_{REF}$. Time period between time t1 and t2 shows how feedback signal $U_{FB}$ 130 and control signal $U_{SR}$ 152 change during an off time of power switch S1 156 with power converter 100 operating in a discontinuous conduction mode. While waveform 452 is at logic high and thus, the switch of synchronous rectification circuit 114 is turned ON, waveform 430 increases since the energy stored in primary winding 110 is being transferred to the output of power converter 100. Waveform 430 goes above level $U_{REF}$ 432 by the end of period $T_D$ 460 and therefore, power switch S1 156 is kept in the OFF state. When waveform 452 switches to logic low indicating that the switch of synchronous rectification circuit 114 is turned OFF, waveform 430 starts to drop. When waveform 430 reaches level $U_{REF}$ 432, waveform 454 transitions to logic high indicating that power switch S1 156 is turned ON. Waveform 430 continues to drop until waveform 454 transitions to logic low, which causes waveform 452 to transition to logic high, thereby starting the off-time of power switch S1 156. This time, however, waveform 432 does not rise above level $U_{REF}$ 430 by the end of period $T_D$ 460. Waveform 454 switches back to logic high at the end of period $T_D$ 460 at time t3, starting a new switching activity which maybe too soon to come after the previous switching activity. Waveforms 430, 452, and 454 illustrate the same behavior between time t4 and t5 where waveform 430 does not rise above level $U_{REF}$ 432 at the end of period $T_D$ 460 and causes waveform 454 to switch to logic high, starting a new switching activity only period $T_D$ 460 after the previous one. As previously mentioned, this may be the result of the ESR of output capacitor C1 118 being small and hence, preventing feedback signal $U_{FB}$ 130 from rising above the reference level quickly enough. As a consequence, several cycles of switching activity may be grouped together such that short periods of switching activity are separated by long stretches of no switching activity, which may lead to unstable operation of power converter 100.

Figure 4B:
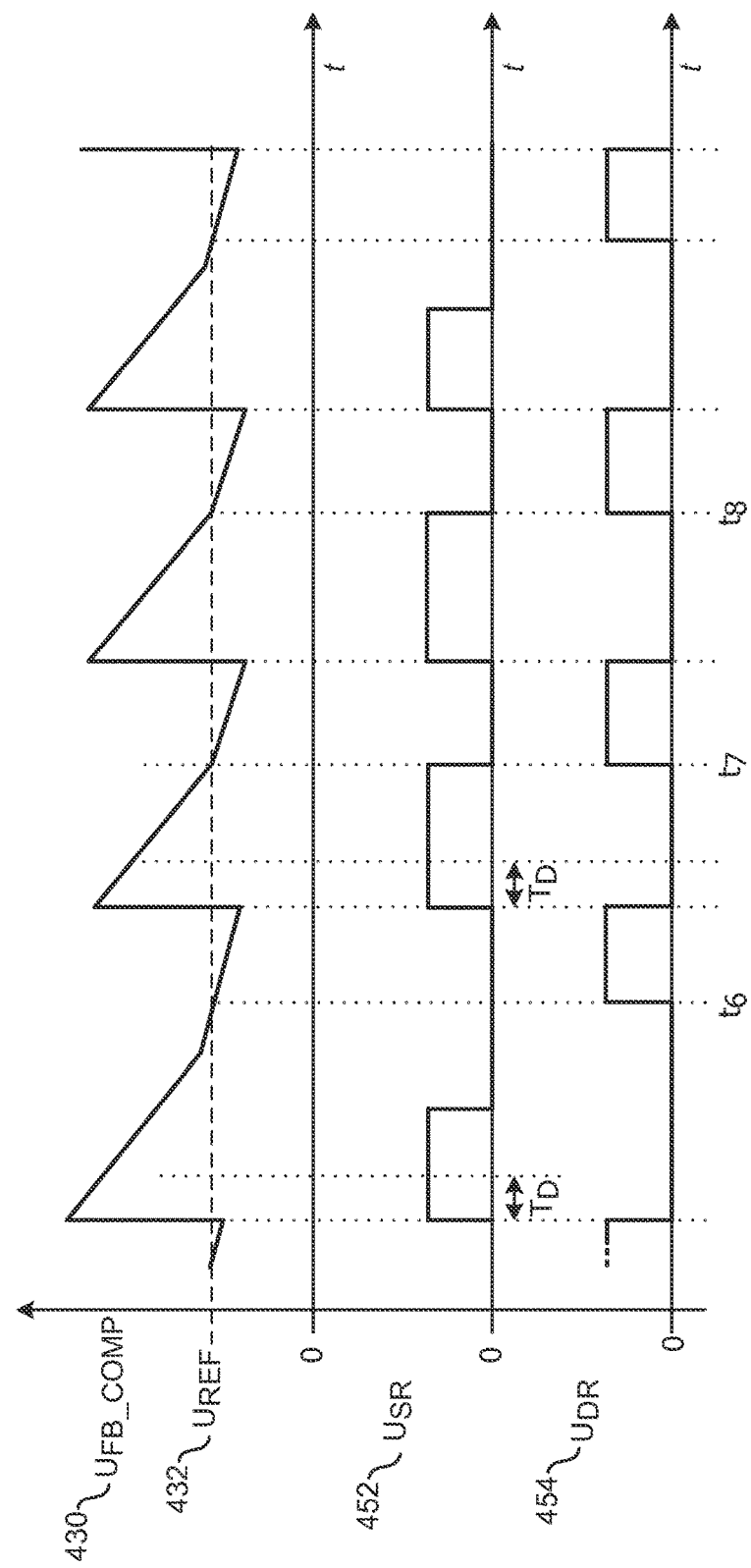
FIG. 4B is a diagram illustrating example waveforms of a feedback signal with compensation, a synchronous rectifier control signal, and a drive signal according to various examples.

FIG. 4B shows example waveforms that illustrate the operation of the controller in FIG. 1 when the compensation signal is provided to the feedback reference circuit. Waveform $U_{FB\_COMP}$ 430 in FIG. 4B represents the compensated feedback signal which is the sum of compensation signal $U_{COMP}$ 146 and feedback signal $U_{FB}$ 130. In the illustrated example, variations in feedback signal $U_{FB}$ 130 are negligibly small with respect to the amplitude of compensation signal $U_{COMP}$ 146. As such, the compensated feedback signal is similar to compensation signal $U_{COMP}$ 146 with the exception of being shifted upwards. With the addition of compensation signal $U_{COMP}$ 146, the compensated feedback signal $U_{FB\_COMP}$ as shown by waveform 430 exceeds level $U_{REF}$ 432 by the end of period $T_D$ 460 during time periods between time t6 and t7, and between t7 and t8, which illustrate the operation of power converter 100 in continuous conduction mode. In this case, a new switching activity does not begin until after waveform 430 drops to level $U_{REF}$ 430, which results in switching activities being sufficiently spaced apart. This helps avoid grouping of switching activities, thereby maintaining a stable operation of power converter 100.

In one example (e.g., FIG. 3C), the difference between the feedback signal $U_{FB}$ 130 and a compensated reference signal has a magnitude at period $T_D$ triggered by a beginning of the charging if output capacitor C1 118 that is higher than a magnitude after period $T_D$ 460. In one example (e.g., FIG. 3B), a difference between a compensated feedback signal and the desired output voltage $U_{REF}$ 432 of power converter 100 has a magnitude at period $T_D$ 460 triggered by a beginning of the charging of output capacitor C1 118 that is higher than a magnitude after period $T_D$ 460. In one example, the differences have a magnitude and a duration to compensate for the charging of the output capacitor C1 118. In one example, period $T_D$ 460 extends beyond an end of the charging of the output capacitor C1 118. In one example, the differences decrease in time with a first substantially linear slope in a first period of time and with a second substantially linear slope after the first period of time. The first substantially linear slope may have a decrease per unit time that is larger than a decrease per unit time of the second substantially linear slope.

Figure 5:
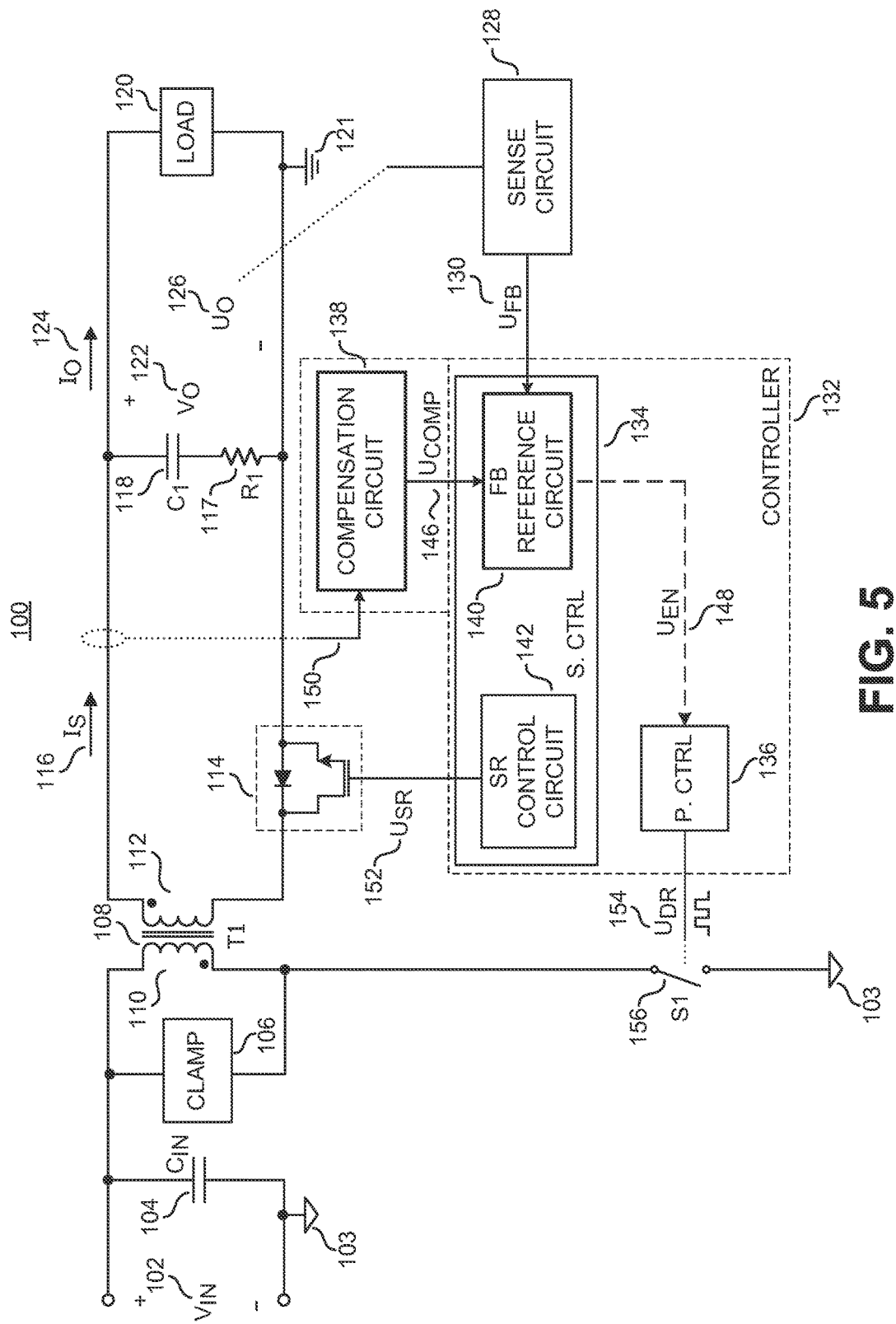
FIG. 5 is a functional block diagram illustrating another example power converter utilizing a compensation circuit according to various examples.

FIG. 5 shows a schematic of another example power converter utilizing a compensation circuit. The power converter illustrated in FIG. 5 is similar to power converter 100 of FIG. 1 except that compensation circuit 138 is coupled to output compensation signal $U_{COMP}$ 146 in response to receiving a sense signal 150 representative of a current IS 116 that goes from secondary winding 112 to the output of the power converter. Since current IS 116 is substantially zero when power switch S1 156 is in the ON state, compensation signal $U_{COMP}$ 146 is also zero during the on time of power switch S1 156. When power switch S1 156 transitions to the OFF state and primary winding 110 starts transferring energy to secondary winding 112, both current IS 116 and compensation signal $U_{COMP}$ 146 become non-zero. Compensation signal $U_{COMP}$ 146 drops to zero again either before the off time of power switch S1 156 is over or by the start of the next on time of power switch S1 156. In other words, compensation signal $U_{COMP}$ 146 is non-zero only during the off time of power switch S1 156.

Figure 6:
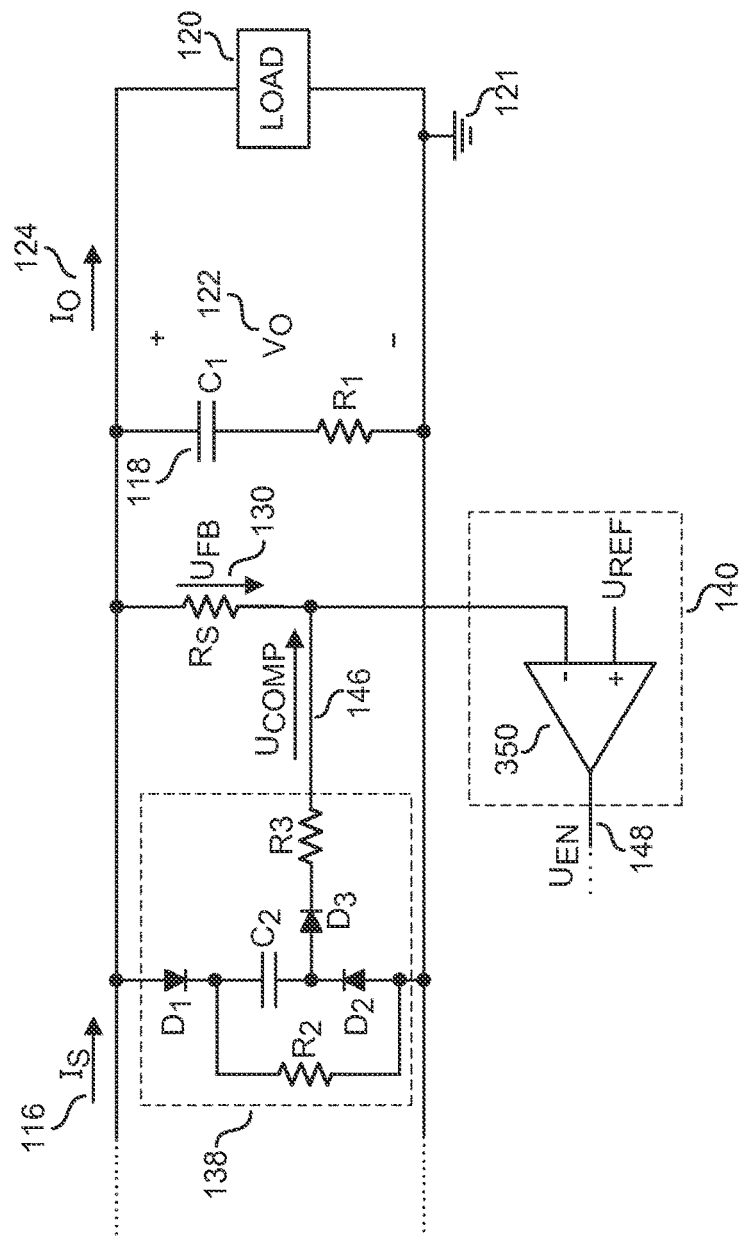
FIG. 6 is a functional block diagram illustrating another example compensation circuit and another example feedback reference circuit according to various examples.

FIG. 6 shows an example circuit schematic for the compensation circuit illustrated in FIG. 5. In the depicted example, only feedback reference circuit 140 and secondary side of power converter 100 are shown. Compensation circuit 138 in FIG. 6 is outside of controller 132 and includes resistors R2, R3, diodes D1, D2, D3, and a capacitor C2. Feedback reference circuit 140 is coupled to receive feedback signal $U_{FB}$ 130 through a sense resistor RS which is coupled between the negative terminal of comparator 350 and the output of power converter 100. As shown, one end of capacitor C2 is coupled to cathode terminal of diode D1 and the other end is coupled to cathode terminal of diode D2. Anode terminals of diode D1 and D2 are coupled to the output of power converter 100 and output return 121, respectively. Resistor R2 is coupled across cathode terminal of diode D1 and output return 121. Diode D3 is coupled on one end to cathode terminal of diode D2 and on the other end to the output of compensation circuit 138 with resistor R3.

In operation, when power switch S1 156 is in the ON state, both current IS 116 and the voltage across capacitor C2 are zero. When current IS 116 rises to its non-zero peak level after power switch S1 156 is turned OFF, diode D2 becomes reverse biased. Capacitor C2 charges to a certain voltage level with a portion of current IS 116 through diodes D1, D3, and resistor R3 such that diode D1 becomes reverse biased and a portion of current IS 115 no longer goes into compensation circuit 138. That is when compensation signal $U_{COMP}$ 146 reaches an initial non-zero level. From hereon, capacitor C2 discharges through resistors R2, R3, and diodes D2, D3 into the negative input terminal of comparator 350, causing compensation signal $U_{COMP}$ 146 to drop exponentially from the initial level. Compensation signal $U_{COMP}$ 146 generated in this manner appears different from compensation signal $U_{COMP}$ 146 shown in FIG. 2 (dropping exponentially versus dropping in piecewise linear fashion) but has a similar influence on feedback reference circuit 140 and as a result, can be used as an alternative compensation signal to help avoid grouping of enabled switching cycles in continuous conduction mode.

What is claimed is:
1. Controller circuitry for a switch mode power converter having an output capacitance to smooth an output voltage of the switch mode power converter, the controller circuitry comprising:
an output sense terminal coupled to receive an output sense signal representative of the output voltage of the switch mode power converter;
a switching sense signal terminal coupled to receive a switching sense signal representative of transitions to logic high of a control signal to control switching of a switch of the switch mode power converter;
compensation circuitry coupled to receive the switching sense signal and configured to, based on the switching sense signal, output a compensated reference signal, wherein during at least a part of a time that the output capacitance is being charged, the compensated reference signal is representative of a lower output than a desired output voltage of the switch mode power converter; and
a comparator configured to compare the compensated reference signal with the output sense signal representative of the output voltage of the switch mode power converter,
wherein the comparator is configured to output a comparison result signal indicative of a result of the comparison of the compensated reference signal with the output sense signal.
2. The controller circuitry of claim 1, wherein a difference between the output sense signal representative of the output voltage of the switch mode power converter and the compensated reference signal has a magnitude at a first period of time triggered by a beginning of the charging of the output capacitance that is higher than a magnitude after the first period of time.
3. The controller circuitry of claim 2, wherein the difference has a magnitude and a duration to compensate for the charging of the output capacitance.
4. The controller circuitry of claim 3, wherein a duration of the first period of time extends beyond an end of the charging of the output capacitance.
5. The controller circuitry of claim 2, wherein the difference decreases substantially linearly in time.
6. The controller circuitry of claim 5, wherein the difference decreases in time with a first substantially linear slope in the first period of time and with a second substantially linear slope after the first period of time, wherein the first substantially linear slope has a decrease per unit time that is larger than a decrease per unit time of the second substantially linear slope.
7. The controller circuitry of claim 2, wherein the difference has a magnitude and a duration that compensate for the discharging of the output capacitance by current flowing through an output load in a discontinuous conduction mode.
8. The controller circuitry of claim 1, wherein, during at least a portion of a time that the output capacitance is being discharged, the comparator is configured to compare the compensated reference signal with the output sense signal representative of the output of the switch mode power converter.
9. The controller circuitry of claim 8, wherein the comparator is configured to compare the compensated reference signal with the output sense signal for an entire time that the output capacitance is being discharged.
10. The controller circuitry of claim 1, wherein the switching sense signal is indicative of the switching of at least one of a power switch of the switch mode power converter and a switching of a secondary side synchronous rectifier of the switch mode power converter.
11. The controller circuitry of claim 10, wherein the switching sense signal is received by the switching sense terminal in response to, and contemporaneously with, the power switch turning off.
12. The controller circuitry of claim 1, wherein the comparison result signal indicates that switching of a power switch of the switch mode power converter is to be enabled.
13. A switch mode power converter comprising:
a primary side having an input;
an energy transfer element;

a secondary side galvanically isolated from the primary side by the energy transfer element, the secondary side comprising:
- output terminals that couple the switch mode power converter to a load,
- an output capacitance coupled across the output terminals,
- a compensation signal generator configured to generate a compensation signal having a magnitude and a timing, wherein the compensation signal compensates the charging of the output capacitance with power transferred from the primary side to the secondary side, and wherein the compensation signal is generated in response to a sense signal which includes a timing of a current conduction from the secondary side of the energy transfer element to the output capacitance,
- computational circuitry configured to output an adjusted compensation signal that compensates, based on the compensation signal, one of an output sense signal representative of an output signal at the output terminals and a reference signal representative of a desired output voltage of the switch mode power converter; and
- a comparator to compare the adjusted compensation signal with the other one of the output sense signal and the reference signal.

14. The switch mode power converter of claim 13, wherein the secondary side further comprises a rectifier configured to selectively conduct current from the energy transfer element to the output capacitance.

15. The switch mode power converter of claim 14, wherein the rectifier includes a synchronized rectifier driven by a drive signal.

16. The switch mode power converter of claim 15, wherein the compensation signal has a magnitude at a first period of time triggered by a beginning of the charging of the output capacitance that is higher than a magnitude after the first period of time.

17. The switch mode power converter of claim 16, wherein the magnitude of the compensation signal decreases substantially linearly in time.

18. The switch mode power converter of claim 17, wherein the magnitude of the compensation signal decreases with a first substantially linear slope in the first period of time and with a second substantially linear slope after the first period of time, wherein the first substantially linear slope has a larger decrease per unit time than a decrease per unit time of the second substantially linear slope.

19. The switch mode power converter of claim 18, wherein the first period of time occurs when the rectifier selectively conducts current from the energy transfer element to the output capacitance.

20. The switch mode power converter of claim 13, wherein, during at least a portion of a time that the output capacitance is being discharged, the comparator is configured to compare the adjusted compensation signal with the other one of the output sense signal and the reference signal.

21. The switch mode power converter of claim 20, wherein the comparator is configured to compare the adjusted compensation signal with the other one of the output sense signal and the reference signal for an entire time that the output capacitance is being discharged.

22. The switch mode power converter of claim 13, wherein the comparator is configured to output the comparison result signal to indicate that switching of a power switch on the primary side of the switch mode power converter is to be enabled.

23. A controller for a power converter, the controller comprising:
- a secondary controller circuit coupled to receive a feedback signal representative of an output of the power converter and a compensation signal, wherein the secondary controller is configured to output a drive enable signal in response to a comparison between a combination of the feedback signal with the compensation signal and a reference that is representative of a desired output power of the power converter;
- a primary controller circuit coupled to receive the drive enable signal from the secondary controller, wherein the primary controller circuit is configured to output a drive signal for controlling a power switch of the power converter in response to the drive enable signal; and
- a compensation circuit coupled to receive a switching sense signal representative of transitions to logic high of a control signal to control switching of a synchronous rectification circuit of the power converter, wherein the compensation circuit is configured to output the compensation signal based at least in part on the switching sense signal.

24. The controller of claim 23, wherein the secondary controller circuit further comprises:
- a feedback reference circuit coupled to receive the feedback signal and the compensation signal, wherein the feedback reference circuit is configured to output the drive enable signal in response to the comparison between the combination of the feedback signal with the compensation signal and the reference.

25. The controller of claim 24, wherein the feedback reference circuit comprises:
- an adder circuit coupled to receive the feedback signal and the compensation signal; and
- a comparator circuit comprising an inverting terminal coupled to the output of the adder circuit and a non-inverting terminal coupled to receive the reference signal, wherein the comparator circuit is coupled to output the drive enable signal.

26. The controller of claim 24, wherein the feedback reference circuit comprises:
- a subtractor circuit coupled to receive the reference signal and the compensation signal, wherein the subtractor circuit is configured to subtract the compensation signal from the reference signal; and
- a comparator circuit comprising an inverting terminal coupled to receive the feedback signal and a non-inverting terminal coupled to receive the output of the subtractor circuit, wherein the comparator circuit is coupled to output the drive enable signal.

27. The controller of claim 24, wherein the secondary controller further comprises a control circuit coupled to output a control signal to control switching of a synchronous rectifier coupled to the output of the power converter.

28. The controller of claim 23, wherein the compensation circuit comprises:
- a monostable multivibrator circuit coupled to receive the switching sense signal;
- a first switch coupled to receive an output of the monostable multivibrator circuit;
- a voltage source having a first threshold voltage and coupled between a return of the power converter and a first end of the first switch;

a capacitor coupled between the return and a second end of the first switch, wherein a voltage across the capacitor corresponds to the compensation signal;

a comparator comprising an inverting terminal coupled to the second end of the first switch and the capacitor and a non-inverting terminal coupled to receive a threshold signal having a second threshold voltage;

a first AND gate circuit comprising a first terminal coupled to receive an output of the comparator and a second terminal coupled to receive an inverted output of the monostable multivibrator circuit;

a second AND gate circuit comprising a first terminal coupled to receive an inverted output of the comparator and a second terminal coupled to receive the inverted output of the monostable multivibrator circuit;

a second switch coupled to receive an output of the second AND gate circuit, wherein a first end of the second switch is coupled to the second end of the first switch and the capacitor;

a first independent current source circuit coupled between a second end of the second switch and the return;

a third switch coupled to receive an output of the first AND gate circuit, wherein a first end of the third switch is coupled to the second end of the first switch and the capacitor; and a second independent current source circuit coupled between a second end of the third switch and the return.

29. The controller of claim 28, wherein a value of the second independent current source circuit is greater than a value of the first independent current source circuit.

30. The controller of claim 28, wherein the first threshold voltage is greater than the second threshold voltage.

31. The controller of claim 23, wherein two or more of the secondary controller circuit, the primary controller circuit, and the compensation circuit are included within the same integrated circuit.

32. The controller of claim 23, wherein the secondary controller circuit, the primary controller circuit, and the compensation circuit are included within separate integrated circuits.

33. The controller of claim 23, wherein the compensation circuit is configured to increase a value of the compensation signal to a first threshold value in response to a rising edge of the switching sense signal.

34. The controller of claim 33, wherein after increasing the value of the compensation signal to the first threshold value, the compensation circuit is further configured to decrease the value of the compensation signal at a first rate in response to the value of the compensation signal being equal to or less than the first threshold value and greater than a second threshold value, and wherein the compensation circuit is further configured to decrease the value of the compensation signal at a second rate in response to the value of the compensation signal being equal to or less than the second threshold value.

35. The controller of claim 34, wherein the first rate is greater than the second rate.

36. The controller of claim 23, wherein the controller is configured to cause the power converter to operate in a continuous conduction mode.

37. The controller of claim 23, wherein the controller is configured to cause the power converter to operate in a discontinuous conduction mode.

* * * * *